United States Patent [19]

Ruygrok

[11] 3,870,549

[45] Mar. 11, 1975

[54] INK RECEIVING MATTE SHEET MATERIALS OVERCOATED WITH AN ALKYL MONOESTER OF POLY (ALKYL VINYL ETHER-MALEIC ACID)

[75] Inventor: Albertus Pieter Ruygrok, Leiden, Netherlands

[73] Assignee: GAF Corporation, New York, N.Y.

[22] Filed: Feb. 13, 1973

[21] Appl. No.: 332,173

[52] U.S. Cl. ............... 117/73, 117/15, 117/76 F, 117/76 P, 117/76 T, 117/138.8 F, 260/886
[51] Int. Cl. ................. B32b 23/08, B32b 27/36
[58] Field of Search ............. 117/73, 76 F, 138.8 F

[56] References Cited
UNITED STATES PATENTS 3,489,597  1/1970  Parker ............................. 117/73
3,788,881  1/1974  Tellier .............................. 117/73
R23,514    6/1952  Voss et al. ...................... 260/886

Primary Examiner—Ralph Husack
Attorney, Agent, or Firm—Walter C. Kehm; Samson B. Leavitt; Joshua J. Ward

[57] ABSTRACT

Ink-receiving matte sheet materials, comprising a polyester base support precoated with a cellulosic film-forming polymer and thereafter overcoated with a composition comprising an alkyl monoester of poly (alkyl vinyl ether-maleic acid).

9 Claims, No Drawings

INK RECEIVING MATTE SHEET MATERIALS OVERCOATED WITH AN ALKYL MONOESTER OF POLY (ALKYL VINYL ETHER-MALEIC ACID)

This invention relates to ink receiving matte sheet materials generally and more particularly to a treating composition which when applied to matte surfaces markedly improves the ink receptivity and ink adhesive properties thereof.

Plastic surfaces present a poor totally unsuitable surface for imaging with ink. Inks are generally unable to wet plastic surfaces. Thus, a discontinuous film or ink line is produced. In addition, an ink image on plastic surfaces will readily rub, peel or flake off. Poor ink adhesion on plastic surfaces is a problem in many fields and is particularly troublesome in the drafting field where plastic films, plastic-coated drafting cloths, etc., are commonly imaged with India ink or the like.

Plastic materials require a pre-coating, generally a lacquer, in order to accept ink directly to the surface. Plastic base materials may include, but are not limited to, polyvinyl chloride, polyvinyl acetate, polystyrene, polyethylene terephthalate, polycarbonate, bisphenol-A-polycarbonate, and paper and cloth stock overcoated with these materials. The most commonly used plastic base support material which requires such a precoat is a polyester. A specific polyester which finds widespread use is a heat-set and biaxially-oriented linear polyester such as terephthalic acid ethylene glycol polyester, sold under the trademarks "Mylar"; "Melinex" or "Celanar."

The lacquer precoat which has usually been employed heretofore is a cellulosic film-forming polymer such as nitrocellulose, ethyl cellulose, cellulose acetate, cellulose acetate propionate, cellulose acetate butyrate, or other cellulose esters or ethers or the like, dissolved in suitable solvents such as, methylethyl ketone, ethyl acetate, methyl isobutyl ketone, toluene, etc. Included in the lacquer coating may be a plasticizer such as an alkyd resin or phthalate ester. In addition, a hardener such as urea-formaldehyde resin may also be added. This lacquer coating may vary in thickness from 0.2 to 1.0 mil depending on the end use of the plastic media.

In order to provide a matte finish, suitable for marking with ink, the lacquer coating may include a finely divided pigment such as finely powdered glass having a particle size ranging from 2–6 microns, amorphous or diatomaceous silica. Titanium dioxide may also be added to impart a white background color.

A serious failing of such heretofore known lacquered surfaces is that they still exhibit insufficient ink receptivity. As already indicated, poor ink receptivity is common to plastic materials generally. The ink indicia tends to feather so that it is difficult to draw sharp, well-defined lines. The ink tends to accumulate in excess amounts at the beginning of the writing or drawing at stoppage points or slow down in writing such that small globules of ink form at these points. This is particularly undesirable in engineering documents. In addition, the ink image is not firmly affixed to the plastic surface. This can be readily demonstrated by an adhesion test in which a piece of pressure-sensitive tape is placed across an ink-imaged area. Rapid, as well as slow peeling of the tape from the imaged area, will remove most of the ink image. In addition to being readily removed with pressure-sensitive tape, the ink will flake off when the plastic member is creased across the ink image. Ink images in the past have not lent themselves to correction with a type of erasing knife which chipped off uncontrolled portions of the image rather than deleted only specific portions. Thus, ragged, bordering edges result.

It is an object of this invention to provide a treating composition and/or an overcoated article which will not be subject to one or more of the above disadvantages.

It is a further object of this invention to provide an improved matte sheet material capable of accepting ink indicia.

It is another object of this invention to provide an improved method and materials for treating a plastic surface to render it ink-receptive so that an ink image thereon will be readily and firmly affixed thereto. Other objects and advantages will appear as the description proceeds.

The attainment of the above objects is made possible by this invention which comprises the provision of improved matte sheet materials capable of receiving ink markings comprising a polyester film at least one surface of which carries a first layer of cellulosic matte film-forming lacquer composition, the surface of said first layer carrying a second layer comprising an alkyl monoester of poly (alkyl vinyl ether-maleic acid).

The above matte lacquer composition may include as the film-forming material a cellulosic compound such as cellulose acetate, cellulose nitrate, cellulose acetate butyrate, cellulose acetate propionate, either alone or in admixture with polyvinylidene chloride, polyvinyl chloride, polyvinyl acetate, polyurethane, polystyrene, polymethyl methacrylate, polyethyl methacrylate, polymethyl acrylate, polyethyl acrylate, the copolymer of acrylonitrilebutadiene styrene, phenol-formaldehyde, urea-formaldehyde, polyisocyanates, polyester and polycarbonate.

The plastic base support material and/or the precoat thereon may be transparent, translucent or opaque and may be coated on one or both sides with the treating composition.

According to this invention, the aforementioned matte surfaces are rendered highly ink receptive by treating the matte surface with a treating composition comprising a polymer of an alkyl monoester of poly (alkylvinyl ether-maleic acid.) The resulting overcoated matte surface has greatly improved ink-receptive properties and the ink image is well-defined and adheres firmly to the surface. An ink image on the overcoated matte surface is not readily removed with pressure-sensitive tape nor does it exhibit the aforementioned poor ink-receptive properties.

In achieving the objects of this invention, a treating composition comprising an alkyl monester of poly(alkyl vinyl ether-maleic acid) dissolved or dispersed in a liquid medium is applied to a plastic pre-lacquered matte surface. The liquid medium may include, but is not limited to, ethanol, isopropanol, diethyleneglycol, tetrahydrofuran, ethylene glycol monomethyl ether butyl carbitol, butyrolactone, acetone, cyclohexanone, dioxane, and mixtures thereof.

The lacquer precoats described in the discussion of the prior art, if desired containing finely divided pigment and/or titanium dioxide, when treated in accordance with this invention exhibit improved ink-receptive properties.

The alkyl monoesters of poly(alkylvinylether-maleic acid) utilized in the present invention are prepared by first reacting and interpolymerizing maleic anhydride with an alkyl vinyl ether, i.e., a mono-unsaturate which has the unsaturation adjacent to a terminal carbon atom according to the formula:

$$H_2C = C - OR$$

in which R is an alkyl group of preferably 1 1 to 20 carbon atoms; so as to form a water soluble, linear, resinous interpolymer of an alkyl vinyl ether with maleic anhydride and thereafter esterifying the resulting interpolymer with an alcohol having the formula:

$$R^1OH$$

wherein $R^1$ is an alkyl group of preferably 1 to 7 carbon atoms. The alkyl monoesters of poly(alkyl vinyl ether-maleic acid) can also be prepared by polymerizing an alkyl vinyl ether with maleic anhydride while in the presence of an alcohol. In either instance one mole of alcohol is caused to react with 1 mole of anhydride. The resulting alkyl monoester of poly(alkyl vinyl ether-maleic acid) can be represented by the following formula:

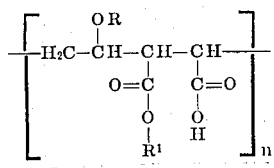

wherein R is an alkyl group of preferably 1 to 20 carbon atoms, $R^1$ is an alkyl group of preferably 1 to 7 carbon atoms and $n$ is an integer of from about 1,000 to 25,000. These alkyl monoesters of poly(alkyl vinyl ether-maleic acid) and their methods of preparation are disclosed in U.S. Pat. No. 2,047,398 (Re. 23,514).

The concentration of the alkyl monoesters of poly(alkyl vinyl vinyl ether-maleic acid) in the treating composition is not critical and may vary from about 0.5 percent to about 10 percent by weight, depending on coating equipment and conditions.

The treating composition can be applied to the surface of the matte by any known coating method such as, for example, air knife, reverse roll bead or wire wound rod. It can also be applied merely by spraying, swabbing the surface with a cloth saturated with the treating composition etc. The amount of treating composition applied to the plastic surface is not a critical factor. Preferably, the amount should be in the range of 0.5 to 10.0 grams per square meter; however, the range can be as broad as 0.3 to 15.0 grams per square meter. After aplication of the treating compostion, drying can be accomplished by ambient evaporation, forced air or heated ovens.

The following examples describe in detail the method and materials that comprise the present invention and are intended to be illustrative of said invention and not limiting thereof. All parts and proportions referred to herein and in the appended claims are by weight unless otherwise indicated.

This invention is not limited to improving the ink receptivity of the film-forming surfaces mentioned in the following examples but will improve the ink-receptive properties of the numerous film-forming surfaces already indicated.

EXAMPLE 1

A treating composition is prepared by mixing 0.5 part by weight of ethyl monoester of poly(methyl vinyl ether-maleic acid) into 99.5 parts by weight of ethyl alcohol. The polymer which is prepared by the process of copolymerizing methyl vinyl ether and maleic anhydride and thereafter esterifying the resulting interpolymer with one mole of ethyl alcohol per mole of anhydride has an acid number of 275 to 300.

This treating composition is applied to a cellulose acetate butyrate-lacquer precoated polyester base by roller coating in conjunction with an air knife, and dried to obtain a thin uniform coating having the desired improved ink-receptive matte surface.

EXAMPLE 2

The procedure of Example 1 is repeated, except the treating composition is instead prepared by mixing 1.0 part by weight of the same ethyl monoester of poly(methyl vinyl ethermaleic acid) into 99 parts by weight ethyl alcohol. Similar results are obtained.

EXAMPLE 3

The procedure of Example 1 is repeated except the treating composition is instead prepared by mixing 10 parts by weight of the same ethyl monoester of poly(methyl vinyl ethermaleic acid) described in Example 1, into 90 parts by weight ethyl alcohol. Similar results are obtained.

EXAMPLES 4, 5 and 6

Examples 1, 2 and 3 are repeated respectively using the isopropyl monoester of poly(methyl vinyl ether-maleic acid) in place of the ethyl monoester of poly(methyl vinyl ether-maleic acid) described in Examples 1, 2 and 3 and using isopropyl alcohol instead of the ethyl alcohol described therein. The isopropyl monoester of poly(methyl vinyl ether-maleic acid) which is prepared by the process of copolymerizing methyl vinyl ether and maleic anhydride and thereafter esterifying the resulting interpolymer with one mole of isopropyl alcohol per mole of anhydride has an acid number of 255 to 285.

EXAMPLES 7, 8 and 9

Examples 1, 2 and 3 are repeated respectively using the butyl monoester of poly(methyl vinyl ether-maleic acid) in place of the ethyl monoester of poly(methyl vinyl ether-maleic acid) described in Examples 1, 2 and 3. The butyl monoester of poly(methyl vinyl ether-maleic acid) which is prepared by the process of copolymerizing methyl vinyl ether and maleic anhydride and thereafter esterifying the resulting interpolymer with one mole of butyl alcohol per mole of anhydride has an acid number of 245 to 275. Similar results are obtained.

Ink images are applied to each of the overcoated matte-surfaced products of Examples 1 through 9. The ink images on each of these treated surfaces adhered firmly thereto. A piece of pressure-sensitive tape was placed across the ink-imaged area on each of these treated surfaces. Rapid as well as slow peeling of the tape from the imaged area did not readily remove the imaged ink.

This invention has been disclosed with respect to certain preferred embodiments and it will be understood that modifications and variations thereof will become obvious to persons skilled in the art and are intended to be included within the spirit and purview of this application and the scope of the appended claims.

I claim:

1. Improved matte sheet material capable of receiving ink markings comprising a polyester film base at least one surface of which carries a first layer of cellulosic matte film-forming lacquer composition, the surface of said first layer carrying a second layer comprising an alkyl monoester of poly(alkyl vinyl ether-maleic acid).

2. The matte sheet material of claim 1 produced by coating at least one surface of a polyester film base with a first layer of cellulosic matte film-forming lacquer composition and thereafter overcoating said first layer with a coating comprising a solvent solution of an alkyl monoester of poly(alkyl vinyl ether-maleic acid).

3. The matte sheet material of claim 2 wherein the alkyl monoester of poly(alkyl vinyl ether-maleic acid) is applied from a solvent solution containing from about 0.5 to about 10.0 percent of said monoester.

4. The matte sheet material of claim 2 wherein the solvent solution is applied to the cellulosic matte lacquer coated film base in the range of about 0.3 to about 15.0 grams per square meter.

5. The matte sheet material of claim 1 wherein the alkyl monoester of poly(alkyl vinyl ether-maleic acid) is the ethyl monoester of poly(methyl vinyl ether-maleic acid).

6. The matte sheet material of claim 1 wherein the alkyl monoester of poly(alkyl vinyl ether-maleic acid) is the isopropyl monoester of poly(methyl vinyl ether-maleic acid).

7. The matte sheet material of claim 1 wherein the alkyl monoester of poly(alkyl vinyl ether-maleic acid) is the butyl monoester of poly(methyl vinyl ether-maleic acid).

8. The matte sheet material of claim 1 wherein the alkyl group of the alkyl monoester component contains 1 to 7 carbon atoms.

9. The matte sheet material of claim 1 wherein the alkyl group of the alkyl vinyl ether component contains 1 to 20 carbon atoms.

* * * * *